United States Patent
Harada et al.

(10) Patent No.: US 9,685,670 B2
(45) Date of Patent: Jun. 20, 2017

(54) METHOD OF OPERATING HYDROGEN GENERATOR AND METHOD OF OPERATING FUEL CELL SYSTEM

(71) Applicant: PANASONIC CORPORATION, Osaka (JP)

(72) Inventors: Chie Harada, Osaka (JP); Hidenobu Wakita, Kyoto (JP); Seiji Fujihara, Osaka (JP); Tomoyuki Nakajima, Hyogo (JP); Takahiro Kusuyama, Osaka (JP); Kiyoshi Taguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 571 days.

(21) Appl. No.: 14/125,283

(22) PCT Filed: Mar. 1, 2013

(86) PCT No.: PCT/JP2013/001277
§ 371 (c)(1),
(2) Date: Dec. 10, 2013

(87) PCT Pub. No.: WO2013/153732
PCT Pub. Date: Oct. 17, 2013

(65) Prior Publication Data
US 2014/0127597 A1    May 8, 2014

(30) Foreign Application Priority Data

Apr. 10, 2012   (JP) ................................. 2012-089680

(51) Int. Cl.
*H01M 8/06*     (2016.01)
*H01M 8/0606*   (2016.01)
(Continued)

(52) U.S. Cl.
CPC ............. *H01M 8/0606* (2013.01); *C01B 3/32* (2013.01); *C01B 3/34* (2013.01); *C01B 3/48* (2013.01);
(Continued)

(58) Field of Classification Search
CPC ........ C01B 2203/02; C01B 2203/0283; C01B 2203/0435; C01B 2203/044;
(Continued)

(56) References Cited

U.S. PATENT DOCUMENTS

| 5,686,196 A | 11/1997 | Singh et al. |
| 2003/0198842 A1* | 10/2003 | Nishida ............. H01M 8/04007 429/414 |

(Continued)

FOREIGN PATENT DOCUMENTS

| JP | 2000-095504 A | 4/2000 |
| JP | 2007-055868 A | 3/2007 |

(Continued)

OTHER PUBLICATIONS

Extended European Search Report issued in European Application No. 13775050.1, dated Mar. 20, 2015.

(Continued)

*Primary Examiner* — Eli Mekhlin
(74) *Attorney, Agent, or Firm* — McDermott Will & Emery LLP

(57) ABSTRACT

A method of operating a hydrogen generator includes: a step (a) of generating a hydrogen-containing gas by a hydrogen generation unit by using a raw material in the hydrogen generation unit; a step (b) of removing a sulfur compound from the raw material by a hydrodesulfurizer which is heated by heat transferred from the hydrogen generation unit; and a step (c) of performing an operation of supplying the raw material to the hydrogen generation unit after (Continued)

stopping the generating of the hydrogen-containing gas by the hydrogen generation unit. The step (c) is not performed unless, at least, a temperature of the hydrodesulfurizer is such a temperature at which carbon deposition from the raw material is suppressed.

13 Claims, 16 Drawing Sheets

(51) Int. Cl.
    *C01B 3/34*    (2006.01)
    *C01B 3/48*    (2006.01)
    *C01B 3/58*    (2006.01)
    *H01M 8/04955*    (2016.01)
    *H01M 8/0612*    (2016.01)
    *H01M 8/0662*    (2016.01)
    *H01M 8/0432*    (2016.01)
    *H01M 8/04746*    (2016.01)
    *C01B 3/32*    (2006.01)

(52) U.S. Cl.
    CPC ........... *C01B 3/58* (2013.01); *H01M 8/04373* (2013.01); *H01M 8/04776* (2013.01); *H01M 8/04955* (2013.01); *H01M 8/0612* (2013.01); *H01M 8/0675* (2013.01); *C01B 2203/025* (2013.01); *C01B 2203/0227* (2013.01); *C01B 2203/0283* (2013.01); *C01B 2203/044* (2013.01); *C01B 2203/045* (2013.01); *C01B 2203/047* (2013.01); *C01B 2203/066* (2013.01); *C01B 2203/0811* (2013.01); *C01B 2203/127* (2013.01); *C01B 2203/1288* (2013.01); *C01B 2203/148* (2013.01); *C01B 2203/16* (2013.01); *C01B 2203/1604* (2013.01); *C01B 2203/1609* (2013.01)

(58) Field of Classification Search
    CPC ........ C01B 2203/047; C01B 2203/048; C01B 2203/0485; C01B 2203/066; C01B 2203/08; C01B 2203/0805; C01B 2203/0811; C01B 2203/0822; C01B 2203/0227; C01B 2203/1288; C01B 2203/16; C01B 2203/1604; C01B 2203/1609; C01B 2203/1614; C01B 2203/01

See application file for complete search history.

(56) References Cited

U.S. PATENT DOCUMENTS

| 2004/0251170 | A1 | 12/2004 | Chiyoda et al. | |
|---|---|---|---|---|
| 2006/0083956 | A1* | 4/2006 | Ukai | B01J 8/0285 |
| | | | | 429/420 |
| 2011/0008688 | A1* | 1/2011 | Kani | C01B 3/384 |
| | | | | 429/410 |
| 2011/0195322 | A1* | 8/2011 | Ukai | C01B 3/384 |
| | | | | 429/410 |
| 2012/0040256 | A1* | 2/2012 | Kani | C01B 3/384 |
| | | | | 429/410 |
| 2013/0143136 | A1* | 6/2013 | Ukai | H01M 8/0438 |
| | | | | 429/410 |

FOREIGN PATENT DOCUMENTS

| JP | 2007-126330 A | 5/2007 | | |
|---|---|---|---|---|
| JP | 2008-016340 A | 1/2008 | | |
| JP | 2010-058995 A | 3/2010 | | |
| JP | 2010-195623 A | 9/2010 | | |
| JP | 2010-280756 A | 12/2010 | | |
| JP | WO 2011077753 A1 * | 6/2011 | ............. | C01B 3/384 |

OTHER PUBLICATIONS

International Search Report issued in International Application No. PCT/JP2013/001277 mailed May 28, 2013.

\* cited by examiner

METHOD OF OPERATING HYDROGEN GENERATOR AND METHOD OF OPERATING FUEL CELL SYSTEM

RELATED APPLICATIONS

This application is a national phase application of the U.S. National Phase under 35 U.S.C. §371 of International Application No. PCT/JP2013/001277, filed on Mar. 1, 2013, which in turn claims the benefit of Japanese Application No. 2012-089680, filed on Apr. 10, 2012, the disclosures of which Applications are incorporated by reference herein.

TECHNICAL FIELD

The present invention relates to a method of operating a hydrogen generator and a method of operating a fuel cell system.

BACKGROUND ART

Fuel cells, which are capable of generating electric power with high efficiency even when they are configured as small-sized devices, have been developed as power generators of distributed energy sources. However, there is no general infrastructure to supply hydrogen gas which is used by a fuel cell when the fuel cell generates electric power. Therefore, in a case where a fuel cell is utilized as a distributed power generator, it is often the case that the fuel cell is installed together with a hydrogen generator. The hydrogen generator is configured to cause a steam reforming reaction of a raw material such as city gas or LPG obtained from an existing fossil fuel infrastructure, thereby generating a hydrogen-containing gas.

One of the advantages of distributed energy sources is to make it possible to obtain necessary energy when necessary. It is desirable for such a distributed energy source to stop operating when there is no energy demand, and it is necessary for the distributed energy source to be capable of frequent start-ups and stops.

In a re-starting operation or pressure compensation operation performed after the hydrogen generator has stopped operating, the raw material is supplied to the hydrogen generator at a suitable timing in such a predetermined temperature range as not to cause thermal decomposition of the raw material in the hydrogen generator (see Patent Literature 1, for example). Accordingly, in the hydrogen generator, carbon deposition onto a reforming catalyst is suppressed, which reduces damage to the catalyst such as cracks.

Odorants such as mercaptans, sulfides, or thiophenes are added to the raw material to be supplied to the hydrogen generator. The raw material is, for example, city gas or LPG obtained from an existing fossil fuel infrastructure. These sulfur compounds poison the reforming catalyst, thereby degrading the function of the reforming catalyst. Therefore, it is necessary to remove such sulfur compounds from the raw material before sending the raw material to the reforming catalyst. One proposed method for removing sulfur compounds from the raw material is a hydrodesulfurization method of desulfurizing sulfur components by using the hydrogen-containing gas generated by the hydrogen generator (see Patent Literatures 2 and 3, for example).

CITATION LIST

Patent Literature

PTL 1: Japanese Laid-Open Patent Application Publication No. 2000-95504

PTL 2: Japanese Laid-Open Patent Application Publication No. 2007-55868

PTL 3: Japanese Laid-Open Patent Application Publication No. 2010-58995

SUMMARY OF INVENTION

Technical Problem

However, neither Patent Literature 2 nor Patent Literature 3 addresses the issue of carbon deposition from the raw material onto a hydrodesulfurization catalyst in a hydrodesulfurizer.

The present invention has been made in view of the above. An object of the present invention is to provide a method of operating a hydrogen generator capable of suppressing, compared to the conventional art, carbon deposition from the raw material onto a hydrodesulfurization catalyst in a hydrodesulfurizer.

Solution to Problem

In order to solve the above-described problems, a method of operating a hydrogen generator according to one aspect of the present invention includes: a step (a) of generating a hydrogen-containing gas by a hydrogen generation unit by using a raw material; a step (b) of removing a sulfur compound from the raw material by a hydrodesulfurizer which is heated by heat transferred from the hydrogen generation unit; and a step (c) of performing an operation of supplying the raw material to the hydrogen generation unit after stopping the generating of the hydrogen-containing gas by the hydrogen generation unit. The step (c) is not performed unless, at least, a temperature of the hydrodesulfurizer is such a temperature at which carbon deposition from the raw material is suppressed.

Advantageous Effects of Invention

The method of operating a hydrogen generator according to the one aspect of the present invention makes it possible to suppress, compared to the conventional art, carbon deposition from the raw material onto a hydrodesulfurization catalyst in the hydrodesulfurizer.

DESCRIPTION OF EMBODIMENTS (Embodiment 1)

Figure 1:
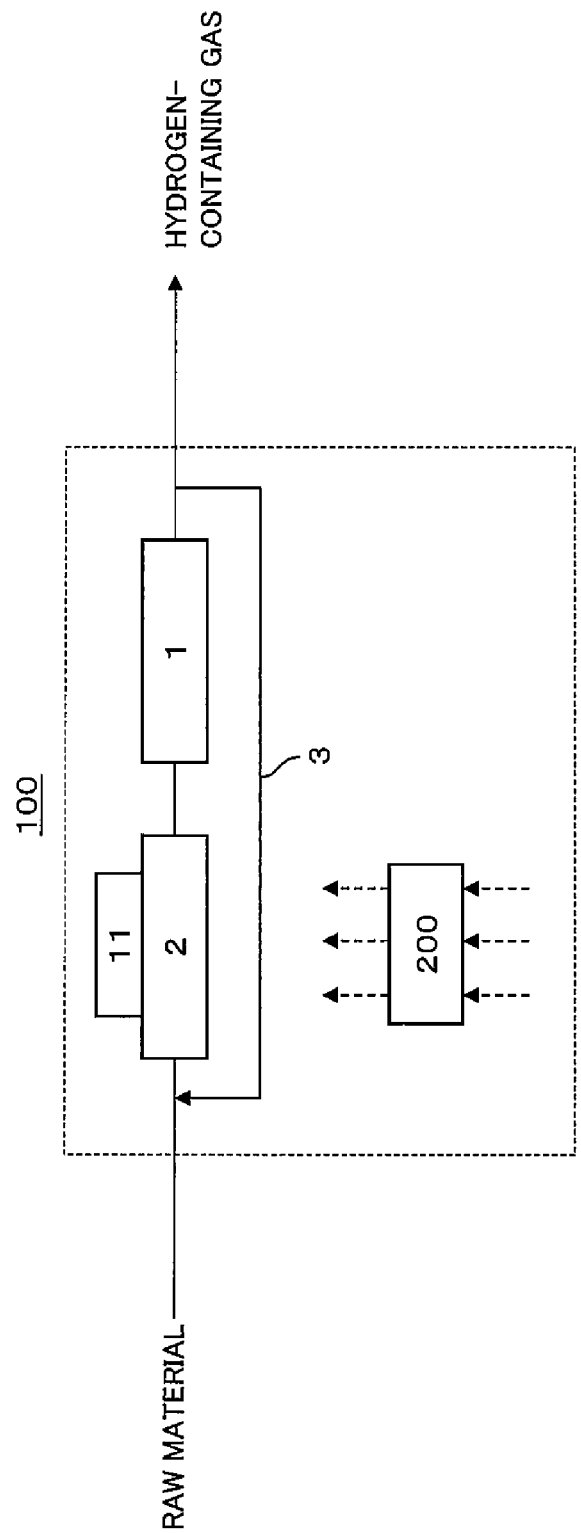
FIG. 1 is a block diagram showing one example of a hydrogen generator according to Embodiment 1.

First, before specific configurations and operations according to Embodiment 1 of the present invention are described, the background that has led to Embodiment 1 is described.

The raw material is supplied to the hydrogen generator after sulfur compounds are removed from the raw material by a hydrodesulfurizer. Accordingly, for example, at operation stop or re-starting of the hydrogen generator, only the raw material is introduced into the hydrodesulfurizer. At the time, there is a case where carbon from the raw material is deposited onto a hydrodesulfurization catalyst in the hydrodesulfurizer.

In particular, as described in an example given by Patent Literature 3, in a hydrogen generator in which a hydrodesulfurizer is heated by heat transferred from a hydrogen generation unit, even if a hydrogen-containing gas generating operation by the hydrogen generation unit is stopped, the temperature of the hydrodesulfurizer does not easily drop since the hydrodesulfurizer receives heat from the hydrogen generation unit. In some cases, the temperature of the hydrodesulfurizer even becomes higher than the temperature thereof when the hydrogen generator is in operation. For this reason, at operation stop or re-starting of the hydrogen generator, when only the raw material is introduced into the hydrodesulfurizer, it is possible that thermal decomposition of the raw material occurs in the hydrodesulfurizer, causing carbon deposition from the raw material.

For example, in a case where the hydrodesulfurizer is configured to be heated by heat transferred from a reformer of the hydrogen generation unit, if the hydrogen-containing gas generating operation by the hydrogen generation unit is stopped, then a reforming reaction using steam, which is an endothermic reaction, is stopped. Accordingly, for a while after the hydrogen-containing gas generating operation is stopped, the temperature of the reformer may be higher than the temperature thereof when the hydrogen-containing gas generating operation is being performed. This may cause the temperature of the hydrodesulfurizer to increase to such a temperature at which carbon deposition from the raw material occurs when the raw material is flowed through the hydrodesulfurizer.

It should be noted that the above case is merely one example. A case where after the hydrogen-containing gas generating operation by the hydrogen generation unit has stopped, the temperature of the hydrodesulfurizer receiving heat from the hydrogen generation unit increases to such a temperature at which carbon deposition from the raw material occurs is not limited to the above example.

Carbon deposition from the raw material onto the hydrodesulfurization catalyst causes passage blockage, which causes pressure loss increase or the like in the hydrogen generator. Consequently, there is a possibility that the hydrogen generator is hindered from operating in a stable manner.

In view of the above, a method of operating a hydrogen generator according to Embodiment 1 includes: a step (a) of generating a hydrogen-containing gas by a hydrogen generation unit by using a raw material; a step (b) of removing a sulfur compound from the raw material by a hydrodesulfurizer which is heated by heat transferred from the hydrogen generation unit; and a step (c) of performing an operation of supplying the raw material to the hydrogen generation unit after stopping the generating of the hydrogen-containing gas by the hydrogen generation unit. The step (c) is not performed unless, at least, a temperature of the hydrodesulfurizer is such a temperature at which carbon deposition from the raw material is suppressed.

In the above operating method, the step of performing the operation of supplying the raw material to the hydrogen generation unit may be refrained from being performed until the temperature of the hydrodesulfurizer becomes such a temperature at which carbon deposition from the raw material is suppressed.

Accordingly, carbon deposition from the raw material onto a hydrodesulfurization catalyst in the hydrodesulfurizer can be suppressed compared to the conventional art.

Hereinafter, specific configurations and operations according to Embodiment 1 are described with reference to the drawings.

In the drawings, the same or corresponding elements are denoted by the same reference signs, and repeating the same descriptions of such elements is avoided below as necessary.

[Apparatus Configuration]

FIG. 1 is a block diagram showing one example of a hydrogen generator according to Embodiment 1.

As shown in FIG. 1, a hydrogen generator 100 includes a hydrogen generation unit 1, a hydrodesulfurizer 2, a recycle gas passage 3, a first detector 11, and a controller 200.

The hydrogen generation unit 1 generates a hydrogen-containing gas by using a raw material. Specifically, the hydrogen generation unit 1 includes a reformer configured to cause a reforming reaction of the raw material to generate the hydrogen-containing gas. The reforming reaction may be any type of reforming reaction. Examples of the reforming reaction include a steam reforming reaction, an autothermal reaction, and a partial oxidation reaction. The hydrogen generator 100 includes, as necessary, devices required for the reforming reaction although they are not shown in FIG. 1. For example, if the reforming reaction is a steam reforming reaction, the hydrogen generator 100 includes: a combustor configured to heat the reformer; an evaporator configured to generate steam; and a water supply device configured to supply water to the evaporator. If the reforming reaction is an autothermal reaction, the hydrogen generator 100 further includes an air supply device (not shown)

configured to supply air to the reformer. It should be noted that the raw material is a gas containing an organic compound comprised of at least carbon and hydrogen, such as city gas or natural gas containing methane as a main component, or LPG.

It should be noted that the hydrogen generation unit 1 may include a CO reducer disposed downstream from the reformer and configured to reduce carbon monoxide in the hydrogen-containing gas generated by the reformer. The CO reducer includes at least one of a shift converter and a CO remover, the shift converter being configured to reduce carbon monoxide through a shift reaction, the CO remover being configured to reduce carbon monoxide through at least one of an oxidation reaction and a methanation reaction.

The hydrodesulfurizer 2 is configured to be heated by heat transferred from the hydrogen generation unit 1 and to remove sulfur compounds from the raw material. The hydrodesulfurizer 2 is formed by packing a container with a hydrodesulfurization agent. For example, the hydrodesulfurization agent is a CuZn-based catalyst having a function of converting sulfur compounds into hydrogen sulfide and a function of adsorbing the hydrogen sulfide. However, the hydrodesulfurization agent is not limited to this example. The hydrodesulfurization agent may be formed of: a CoMo-based catalyst for converting sulfur compounds in the raw material into hydrogen sulfide; and one of a ZnO-based catalyst and a CuZn-based catalyst provided downstream from the CoMo-based catalyst, the ZnO-based catalyst and the CuZn-based catalyst being sulfur adsorbents for adsorbing and removing the hydrogen sulfide from the raw material.

The recycle gas passage 3 is a passage through which the hydrogen-containing gas that is to be used for hydrodesulfurization flows. Specifically, the recycle gas passage 3 is configured to feed the hydrogen-containing gas sent out from the reformer to the raw material in a raw material supply passage upstream from the hydrodesulfurizer 2. The upstream end of the recycle gas passage 3 may be connected to any portion of a passage through which the hydrogen-containing gas sent out from the reformer flows. For example, in a case where a CO reducer configured to reduce carbon monoxide in the hydrogen-containing gas is provided downstream from the reformer, the upstream end of the recycle gas passage 3 may be connected to a passage between the reformer and the CO reducer, or may be connected to the CO reducer, or may be connected to a position downstream from the CO reducer. It should be noted that if the CO reducer includes a shift converter and a CO remover, the shift converter being configured to reduce carbon monoxide through a shift reaction, the CO remover being configured to reduce carbon monoxide through at least one of an oxidation reaction and a methanation reaction, then the upstream end of the recycle gas passage 3 may be connected to a passage between the shift converter and the CO remover. That is, the form of connection of the upstream end of the recycle gas passage 3 is not limited to the one shown in FIG. 1, in which the upstream end of the recycle gas passage 3 is connected to a gas passage downstream from the hydrogen generation unit 1. Alternatively, the upstream end of the recycle gas passage 3 may be connected to a passage extending through the hydrogen generation unit 1, so long as the passage is a gas passage downstream from the reformer. Further alternatively, the upstream end of the recycle gas passage 3 may be connected to a passage downstream from hydrogen utilizing equipment configured to utilize the hydrogen-containing gas.

The first detector 11 detects the temperature of the hydrodesulfurizer 2. The first detector 11 may be any detector, so long as the detector is configured to directly or indirectly detect the temperature of the hydrodesulfurizer. The detector configured to directly detect the temperature of the hydrodesulfurizer is a temperature detector detecting the temperature of the hydrodesulfurizer. For example, a thermocouple or thermistor is used as the temperature detector. The detector configured to indirectly detect the temperature of the hydrodesulfurizer is a detector detecting a physical quantity correlated with the temperature of the hydrodesulfurizer. Specific examples of the detector configured to indirectly detect the temperature of the hydrodesulfurizer include: a temperature detector detecting the temperature of the hydrogen generation unit 1; and a timekeeper measuring a time elapsed since a stop of the hydrogen-containing gas generating operation of the hydrogen generation unit 1.

The controller 200 controls the operation of the hydrogen generator 100. The controller 200 may be any device, so long as the controller 200 has control functions. The controller 200 includes an arithmetic processing unit (not shown) and a storage unit (not shown) storing control programs. Examples of the arithmetic processing unit include an MPU and CPU. The storage unit is a memory, for example. The controller 200 may be configured as a single controller performing centralized control, or may be configured as a group of multiple controllers performing distributed control in cooperation with each other.

[Operation]

Figure 2:
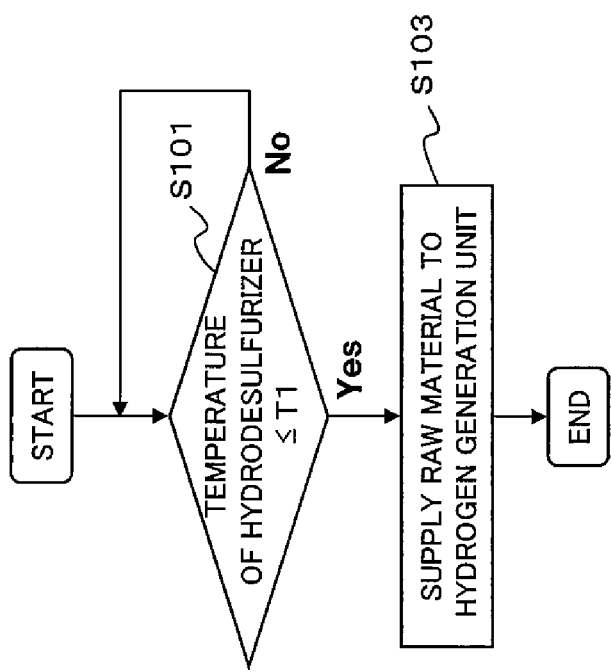
FIG. 2 is a flowchart showing one example of the operation of the hydrogen generator according to Embodiment 1.

FIG. 2 is a flowchart showing one example of the operation of the hydrogen generator according to Embodiment 1.

As shown in FIG. 2, at operation stop or re-starting of the hydrogen generator 100, it is determined whether or not the temperature of the hydrodesulfurizer 2 is lower than or equal to a predetermined temperature T1 (step S101). The temperature T1 corresponds to such a temperature of the hydrodesulfurizer 2 at which carbon deposition from the raw material is suppressed.

If the temperature of the hydrodesulfurizer 2 is determined to be lower than or equal to T1 in step S101, an operation of supplying the raw material to the hydrogen generation unit 1 is performed (step S103). One example of the operation performed in step S103 is an operation of supplying the raw material to the hydrogen generation unit 1 in order to compensate for an internal pressure drop or gas contraction occurring in the hydrogen generation unit 1 due to a temperature drop in the hydrogen generation unit 1. This operation will be described below in Example 1. Another example of the operation performed in step S103 is an operation of supplying the raw material to the hydrogen generation unit 1 at re-starting. This operation will be described below in Example 2 and Example 3.

As shown in FIG. 2, step S103 is not performed unless, at least, the temperature of the hydrodesulfurizer 2 is lower than or equal to T1. That is, step S103 of performing the operation of supplying the raw material to the hydrogen generation unit 1 is refrained from being performed until the temperature of the hydrodesulfurizer 2 is determined to be lower than or equal to T1 in step S101.

It should be noted that the temperature T1 can be obtained through an experiment in advance. In a case where a CoMo-based catalyst is used, the temperature T1 is set to approximately 400° C. In a case where a CuZn-based catalyst is used, the temperature T1 is set to approximately 300° C. It should be noted that these numerical values of the temperature T1 are merely non-limiting examples. The temperature T1 may be set to a desirable numerical value in accordance with the configuration of the hydrodesulfurizer 2.

Thus, the method of operating the hydrogen generator 100 according to Embodiment 1 makes it possible to suppress, compared to the conventional art, carbon deposition from the raw material onto the hydrodesulfurization catalyst in the hydrodesulfurizer 2. This consequently makes it possible to reduce a possibility of occurrence of pressure loss increase or the like in the hydrogen generator 100, thereby reducing a possibility that the hydrogen generator 100 is hindered from operating in a stable manner.

Example 1

A method of operating a hydrogen generator according to Example 1 of Embodiment 1 is such that, in the method of operating the hydrogen generator according to Embodiment 1, the operation of supplying the raw material to the hydrogen generation unit includes an operation of supplying the raw material to the hydrogen generation unit in order to compensate for an internal pressure drop or gas contraction occurring in the hydrogen generation unit due to a temperature drop in the hydrogen generation unit.

In the above operating method, the step of performing the operation of supplying the raw material to the hydrogen generation unit may be refrained from being performed until the temperature of the hydrodesulfurizer becomes such a temperature at which carbon deposition from the raw material is suppressed.

Accordingly, at operation stop of the hydrogen generator, carbon deposition from the raw material onto the hydrodesulfurization catalyst in the hydrodesulfurizer can be suppressed compared to the conventional art.

Except for the above-described features, the method of operating the hydrogen generator according to Example 1 may be the same as the method of operating the hydrogen generator according to Embodiment 1.

[Apparatus Configuration]

Figure 3:
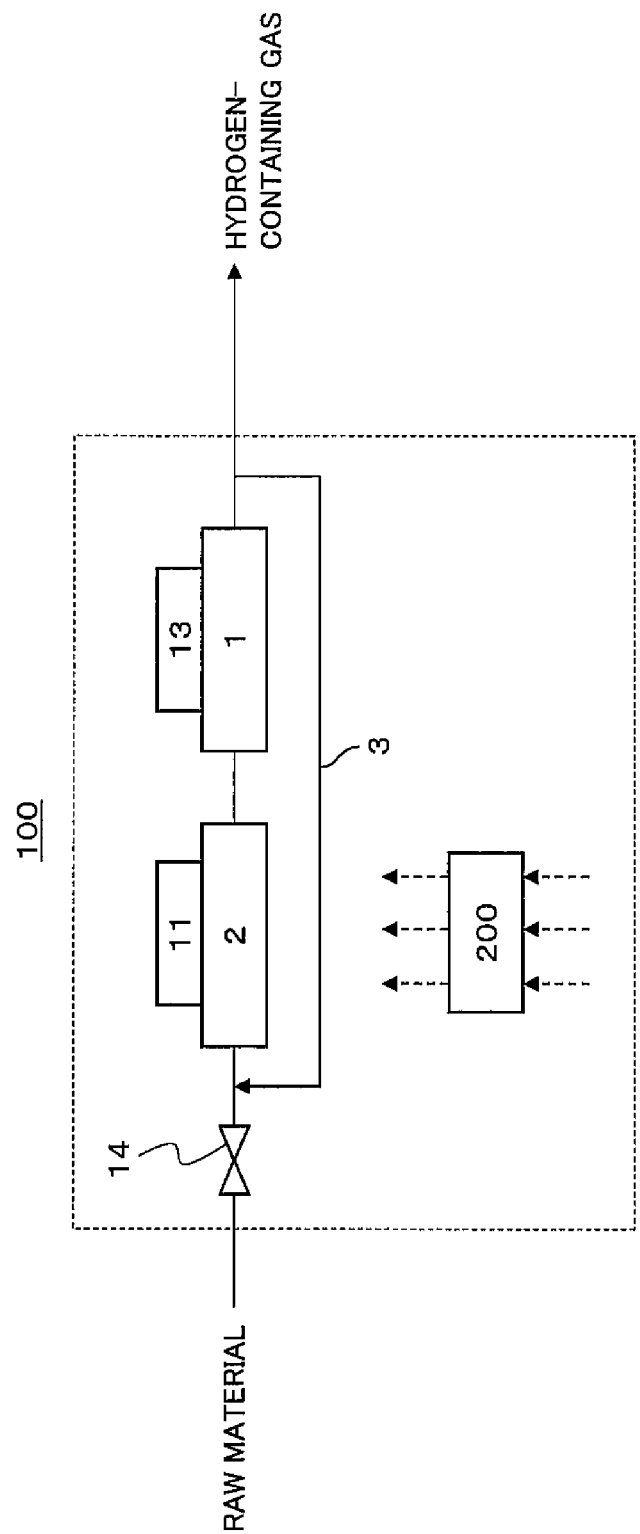
FIG. 3 is a block diagram showing one example of a hydrogen generator according to Example 1 of Embodiment 1.

FIG. 3 is a block diagram showing one example of the hydrogen generator according to Example 1 of Embodiment 1.

As shown in FIG. 3, the hydrogen generator 100 includes an on-off valve 14, the hydrogen generation unit 1, the hydrodesulfurizer 2, the recycle gas passage 3, the first detector 11, a second detector 13, and the controller 200.

The hydrogen generation unit 1, the hydrodesulfurizer 2, the recycle gas passage 3, the first detector 11, and the controller 200 in Example 1 are the same as those in Embodiment 1. Therefore, the description of these components is omitted.

The on-off valve 14 is provided on a raw material passage upstream from a connection point where the raw material passage connects to the recycle gas passage 3. The on-off valve 14 may be configured as any valve, so long as the valve is configured to open and close the raw material passage. The on-off valve 14 may be a solenoid valve, for example.

The second detector 13 detects the temperature of the hydrogen generation unit 1. For example, a thermocouple or thermistor is used as the second detector 13. Any device may be used as the second detector 13, so long as the device is configured to detect the temperature of the hydrogen generation unit 1. It should be noted that, in Example 1, the hydrogen generator 100 includes both of the first detector 11 and the second detector 13. However, as an alternative, the hydrogen generator 100 may include only one of the first detector 11 and the second detector 13, and the included detector may serve to perform temperature detection for the other absent detector. This is possible for the following reason: the hydrogen generation unit 1 and the hydrodesulfurizer 2 exchange heat with each other, and the temperature of the hydrogen generation unit 1 and the temperature of the hydrodesulfurizer 2 are correlated with each other. Specifically, the hydrogen generator 100 may include only the second detector 13 out of the two detectors, and indirectly detect the temperature of the hydrodesulfurizer 2 based on a temperature detected by the second detector 13. Alternatively, the hydrogen generator 100 may include only the first detector 11 out of the two detectors, and indirectly detect the temperature of the hydrogen generation unit 1 based on a temperature detected by the first detector 11.

An on-off valve that is not shown may be provided on the recycle gas passage 3. The on-off valve may be configured as any valve, so long as the valve is configured to open and close the recycle gas passage 3. The on-off valve may be a solenoid valve, for example. By closing the on-off valve when the on-off valve 14 is opened to supply the raw material to the hydrogen generation unit 1, the raw material is suppressed from flowing into the recycle gas passage 3.

[Operation]

Figure 4:
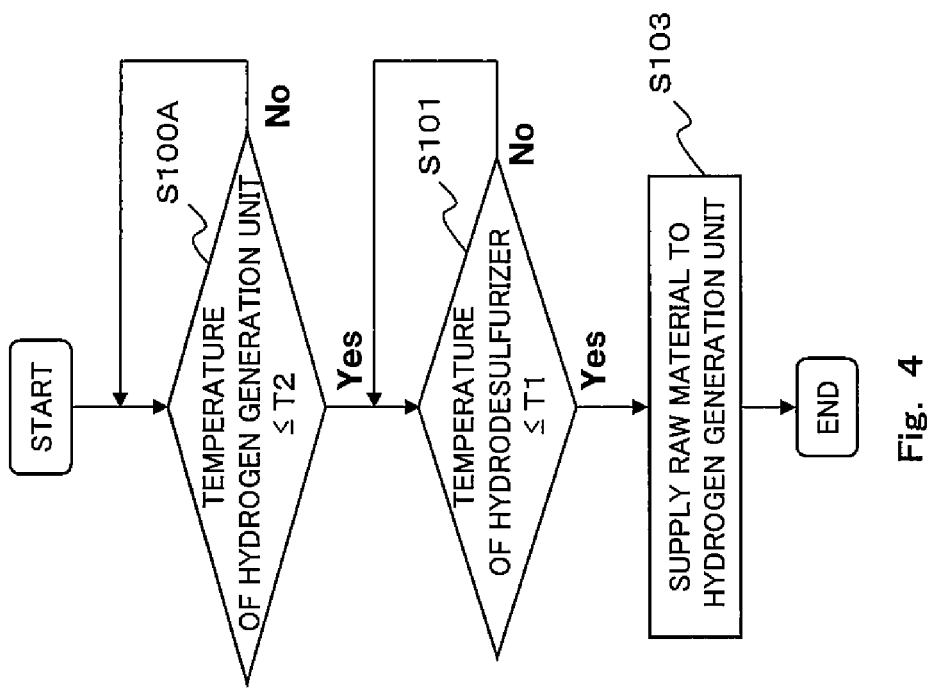
FIG. 4 is a flowchart showing one example of the operation of the hydrogen generator according to Example 1 of Embodiment 1.

FIG. 4 is a flowchart showing one example of the operation of the hydrogen generator according to Example 1 of Embodiment 1.

While the hydrogen generator 100 is in operation, the hydrogen generation unit 1 generates the hydrogen-containing gas by using the raw material, and the hydrodesulfurizer 2 which is heated by heat transferred from the hydrogen generation unit 1 removes sulfur compounds from the raw material.

At operation stop of the hydrogen generator 100, the on-off valve 14 is closed, and as shown in FIG. 4, it is determined whether or not the temperature of the hydrogen generation unit 1 is lower than or equal to a predetermined temperature T2 (step S100A). The temperature T2 corresponds to such a temperature at which it becomes necessary to perform an operation of supplying the raw material to the hydrogen generation unit 1 in order to compensate for an internal pressure drop or gas contraction occurring in the hydrogen generation unit 1 due to a temperature drop in the hydrogen generation unit 1.

If the temperature of the hydrogen generation unit 1 is determined to be lower than or equal to T2 in step S100A, the flow proceeds to a next determination step S101. For example, the controller 200 detects the temperature of the hydrogen generation unit 1 by using the second detector 13, and if the detected temperature is lower than or equal to T2, the controller 200 performs a determination operation in the next step S101.

As described above, if the temperature of the hydrodesulfurizer 2 is determined to be lower than or equal to T1 in step S101, an operation of supplying the raw material to the hydrogen generation unit 1 is performed (step S103). Specifically, an operation of supplying the raw material to the hydrogen generation unit 1 in order to compensate for an internal pressure drop or gas contraction occurring in the hydrogen generation unit 1 due to a temperature drop in the hydrogen generation unit 1 is performed. For example, the controller 200 opens the on-off valve 14 if the temperature detected by the first detector 11 is lower than or equal to T1. Since the raw material supply passage is connected to a raw material source having a predetermined supply pressure, the raw material is supplied into the hydrogen generation unit 1 when the on-off valve 14 is opened.

In the hydrogen generator 100, if a gas passage downstream from the hydrogen generation unit 1 is blocked by a breaker (not shown) when the hydrogen-containing gas generating operation by the hydrogen generation unit 1 is stopped, then the temperature of the hydrogen generation unit 1 drops, causing an internal pressure drop of the hydrogen generation unit 1. In step S103, the on-off valve 14 is opened with the breaker kept operating, and thereby the raw material is supplied to the hydrogen generation unit 1.

Moreover, in the hydrogen generator 100, if the gas passage downstream from the hydrogen generation unit 1 is kept in communication with the atmosphere after the stop of the hydrogen-containing gas generating operation of the hydrogen generation unit 1, then the temperature of the hydrogen generation unit 1 drops, causing gas contraction in the hydrogen generation unit 1. In step S103, the on-off valve 14 is opened to supply the raw material to the hydrogen generation unit 1.

Step S103 is not performed unless, at least, the temperature of the hydrodesulfurizer 2 is lower than or equal to T1. That is, step S103 of performing the operation of supplying the raw material to the hydrogen generation unit 1 is refrained from being performed until the temperature of the hydrodesulfurizer 2 is determined to be lower than or equal to T1 in step S101.

It should be noted that the temperature T1 corresponds to such a temperature of the hydrodesulfurizer 2 at which carbon deposition from the raw material is suppressed.

Example 2

A method of operating a hydrogen generator according to Example 2 of Embodiment 1 is such that, in the method of operating the hydrogen generator according to Embodiment 1, the operation of supplying the raw material to the hydrogen generation unit includes an operation of supplying the raw material to the hydrogen generation unit at re-starting.

In the above operating method, the step of performing the operation of supplying the raw material to the hydrogen generation unit may be refrained from being performed until the temperature of the hydrodesulfurizer becomes such a temperature at which carbon deposition from the raw material is suppressed.

Accordingly, when the hydrogen generator is re-started, carbon deposition from the raw material onto the hydrodesulfurization catalyst in the hydrodesulfurizer can be suppressed compared to the conventional art.

Except for the above-described features, the method of operating the hydrogen generator according to Example 2 may be the same as the method of operating the hydrogen generator according to Embodiment 1.

[Apparatus Configuration]

Figure 5:
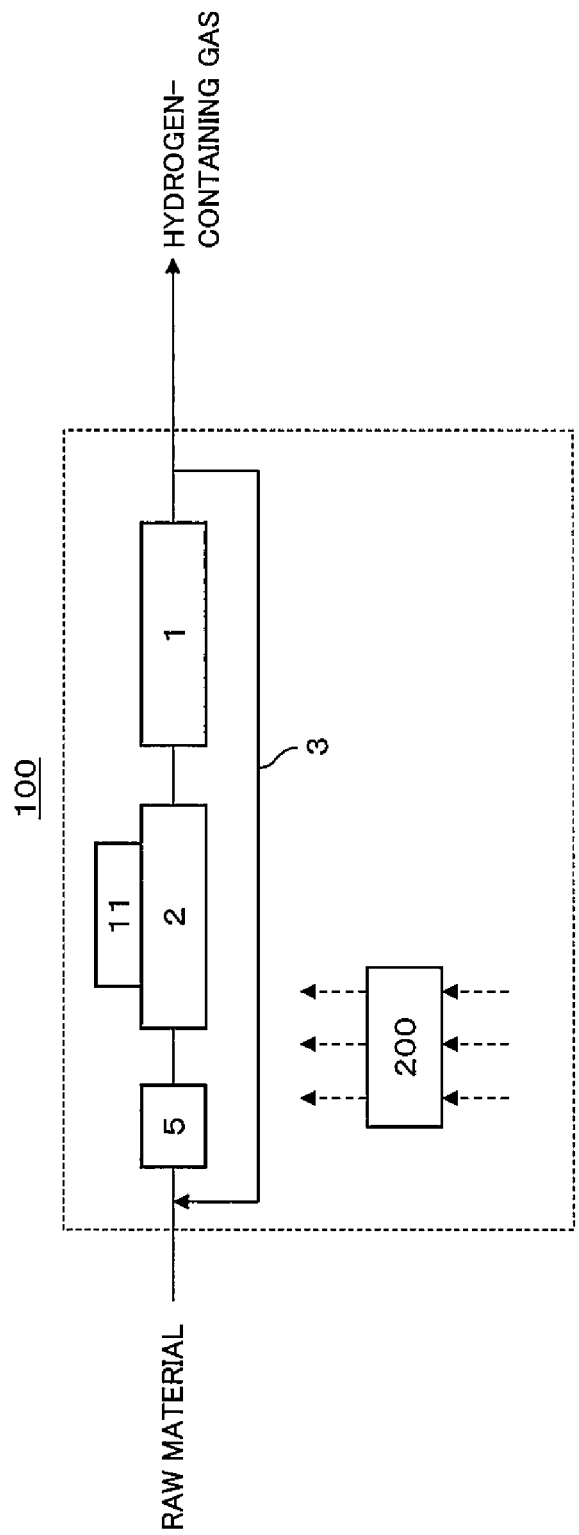
FIG. 5 is a block diagram showing one example of a hydrogen generator according to Example 2 of Embodiment 1.

FIG. 5 is a block diagram showing one example of the hydrogen generator according to Example 2 of Embodiment 1.

As shown in FIG. 5, the hydrogen generator 100 includes a raw material supply device 5, the hydrogen generation unit 1, the hydrodesulfurizer 2, the recycle gas passage 3, the first detector 11, and the controller 200.

The hydrogen generation unit 1, the hydrodesulfurizer 2, the recycle gas passage 3, the first detector 11, and the controller 200 in Example 2 are the same as those in Embodiment 1. Therefore, the description of these components is omitted.

The raw material supply device 5 supplies the raw material to the hydrogen generation unit 1. The raw material supply device 5 is configured to adjust the flow rate of the raw material supplied to the hydrogen generation unit 1. As one example, the raw material supply device 5 includes a booster and a flow rate adjusting valve. As another example, the raw material supply device 5 may include only one of the booster and the flow rate adjusting valve. The booster is a fixed displacement pump, for example. However, the booster is not limited to a fixed displacement pump. The raw material is supplied from a raw material source which has a predetermined supply pressure. Examples of the raw material source include a raw material cylinder tank and a raw material infrastructure.

It should be noted that, similar to Example 1, an on-off valve that is not shown may be provided on the recycle gas passage 3. Accordingly, by closing the on-off valve when the raw material supply device 5 is used to supply the raw material to the hydrogen generation unit 1 at re-starting, the raw material can be suppressed from flowing into the recycle gas passage 3.

[Operation]

Figure 6:
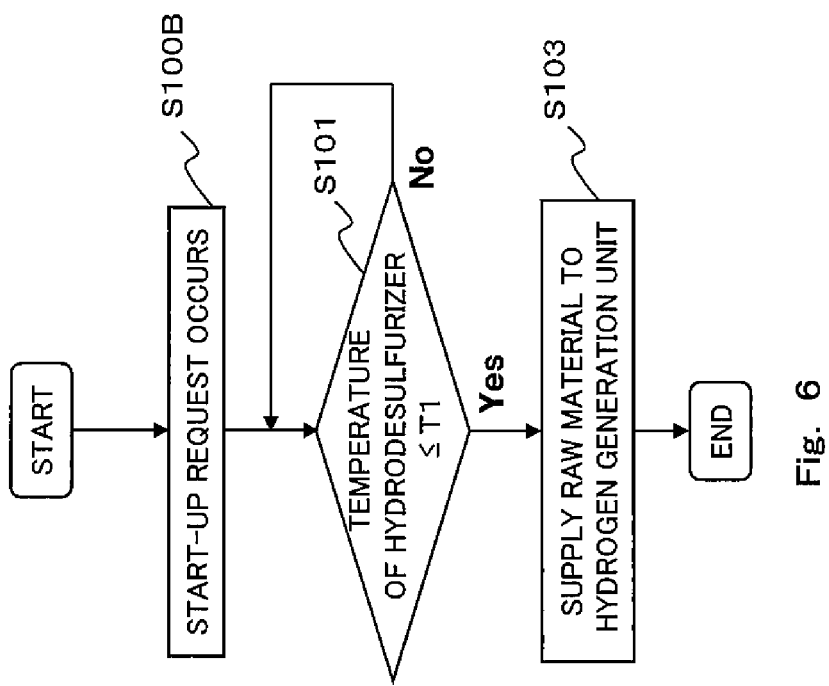
FIG. 6 is a flowchart showing one example of the operation of the hydrogen generator according to Example 2 of Embodiment 1.

FIG. 6 is a flowchart showing one example of the operation of the hydrogen generator according to Example 2 of Embodiment 1.

While the hydrogen generator 100 is in operation, the hydrogen generation unit 1 generates the hydrogen-containing gas by using the raw material, and the hydrodesulfurizer 2 which is heated by heat transferred from the hydrogen generation unit 1 removes sulfur compounds from the raw material.

As shown in FIG. 6, after the hydrogen generator 100 is stopped from operating, if a start-up request occurs (step S100B), then it is determined whether or not the temperature of the hydrogen generation unit 1 is lower than or equal to the predetermined temperature T1 (step S101).

As described above, if the temperature of the hydrodesulfurizer 2 is determined to be lower than or equal to T1 in step S101, an operation of supplying the raw material to the hydrogen generation unit 1 is performed (step S103). Specifically, for example, the controller 200 causes the raw material supply device 5 to operate.

Step S103 is not performed unless, at least, the temperature of the hydrodesulfurizer 2 is lower than or equal to T1. That is, step S103 of performing the operation of supplying the raw material to the hydrogen generation unit 1 is refrained from being performed until the temperature of the hydrodesulfurizer 2 is determined to be lower than or equal to T1 in step S101.

It should be noted that the temperature T1 corresponds to such a temperature of the hydrodesulfurizer 2 at which carbon deposition from the raw material is suppressed.

Example 3

A method of operating a hydrogen generator according to Example 3 of Embodiment 1 is such that, in the method of operating the hydrogen generator according to Embodiment 1, the operation of supplying the raw material to the hydrogen generation unit includes an operation of supplying the raw material to the hydrogen generation unit at re-starting.

The above operating method may include a step of prohibiting re-starting until the temperature of the hydrodesulfurizer becomes such a temperature at which carbon deposition from the raw material is suppressed.

Accordingly, when the hydrogen generator is re-started, carbon deposition from the raw material onto the hydrodesulfurization catalyst in the hydrodesulfurizer can be suppressed compared to the conventional art.

Except for the above-described features, the method of operating the hydrogen generator according to Example 3 may be the same as the method of operating the hydrogen generator according to Embodiment 1.

[Apparatus Configuration]

As with the apparatus configuration according to Example 2 shown in FIG. 5, the hydrogen generator 100 includes the raw material supply device 5, the hydrogen generation unit 1, the hydrodesulfurizer 2, the recycle gas passage 3, the first detector 11, and the controller 200.

Since the apparatus configuration according to Example 3 is the same as the apparatus configuration according to Example 2, the description of the apparatus configuration according to Example 3 is omitted.

[Operation]

Figure 7:
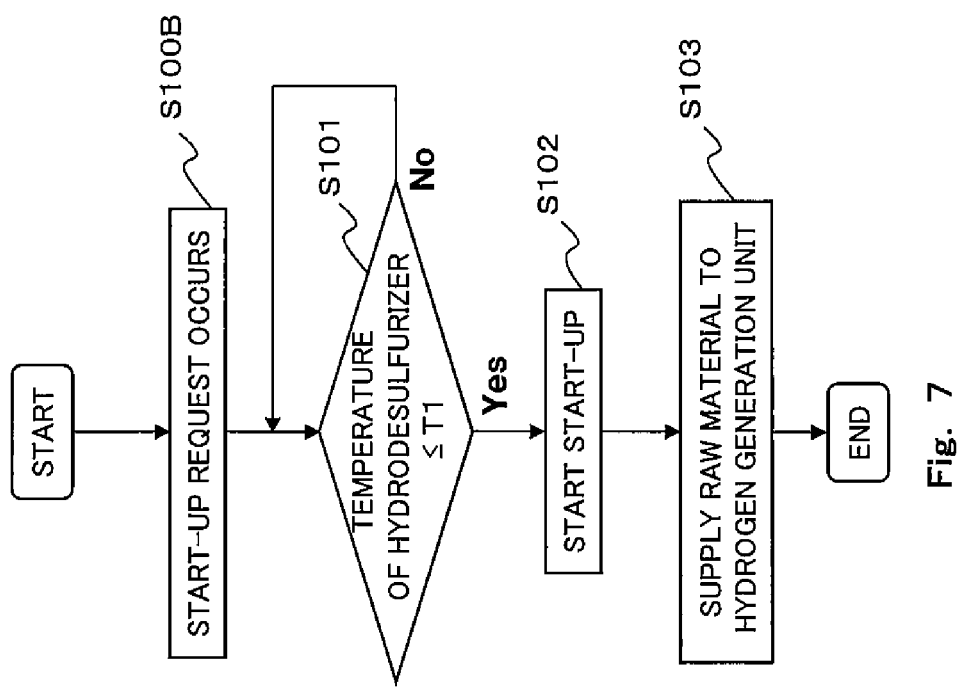
FIG. 7 is a flowchart showing one example of the operation of a hydrogen generator according to Example 3 of Embodiment 1.

FIG. 7 is a flowchart showing one example of the operation of the hydrogen generator according to Example 3 of Embodiment 1.

While the hydrogen generator 100 is in operation, the hydrogen generation unit 1 generates the hydrogen-containing gas by using the raw material, and the hydrodesulfurizer 2 which is heated by heat transferred from the hydrogen generation unit 1 removes sulfur compounds from the raw material.

As shown in FIG. 7, after the hydrogen generator 100 is stopped from operating, if a start-up request occurs (step S100B), then it is determined whether or not the temperature of the hydrogen generation unit 1 is lower than or equal to the predetermined temperature T1 (step S101). The temperature T1 corresponds to such a temperature of the hydrodesulfurizer 2 at which carbon deposition from the raw material is suppressed.

If the temperature of the hydrodesulfurizer 2 is determined to be lower than or equal to T1 in step S101, start-up of the hydrogen generator 100 is started (step S102).

Start-up of the hydrogen generator 100 is not started if the temperature of the hydrodesulfurizer 2 is determined to be higher than T1 in step S101. Thus, step S101 and step S102 collectively form a step of prohibiting re-starting until the temperature of the hydrodesulfurizer 2 is reduced to the temperature T1 at which carbon deposition from the raw material is suppressed.

If start-up of the hydrogen generator 100 is started in step S102, an operation of supplying the raw material to the hydrogen generation unit 1 is performed (step S103). Specifically, for example, the controller 200 causes the raw material supply device 5 to operate.

(Embodiment 2)

A method of operating a hydrogen generator according to Embodiment 2 is such that, the method of operating the hydrogen generator according to any one of Embodiment 1 and Examples 1 to 3 of Embodiment 1 further includes a step of performing a cooling process of reducing the temperature of the hydrodesulfurizer after stopping the generating of the hydrogen-containing gas.

Accordingly, after the generating of the hydrogen-containing gas is stopped, a time required before supplying the raw material to the hydrogen generation unit can be reduced compared to a case where the above cooling process is not performed. Therefore, at operation stop or re-starting of the hydrogen generator, an operation of supplying the raw material to the hydrogen generation unit can be performed more promptly than in a case where the above cooling process is not performed after the generating of the hydrogen-containing gas is stopped.

Except for the above-described features, the method of operating the hydrogen generator according to Embodiment 2 may be the same as the method of operating the hydrogen generator according to any one of Embodiment 1 and Examples 1 to 3 of Embodiment 1.

[Apparatus Configuration]

Figure 8:
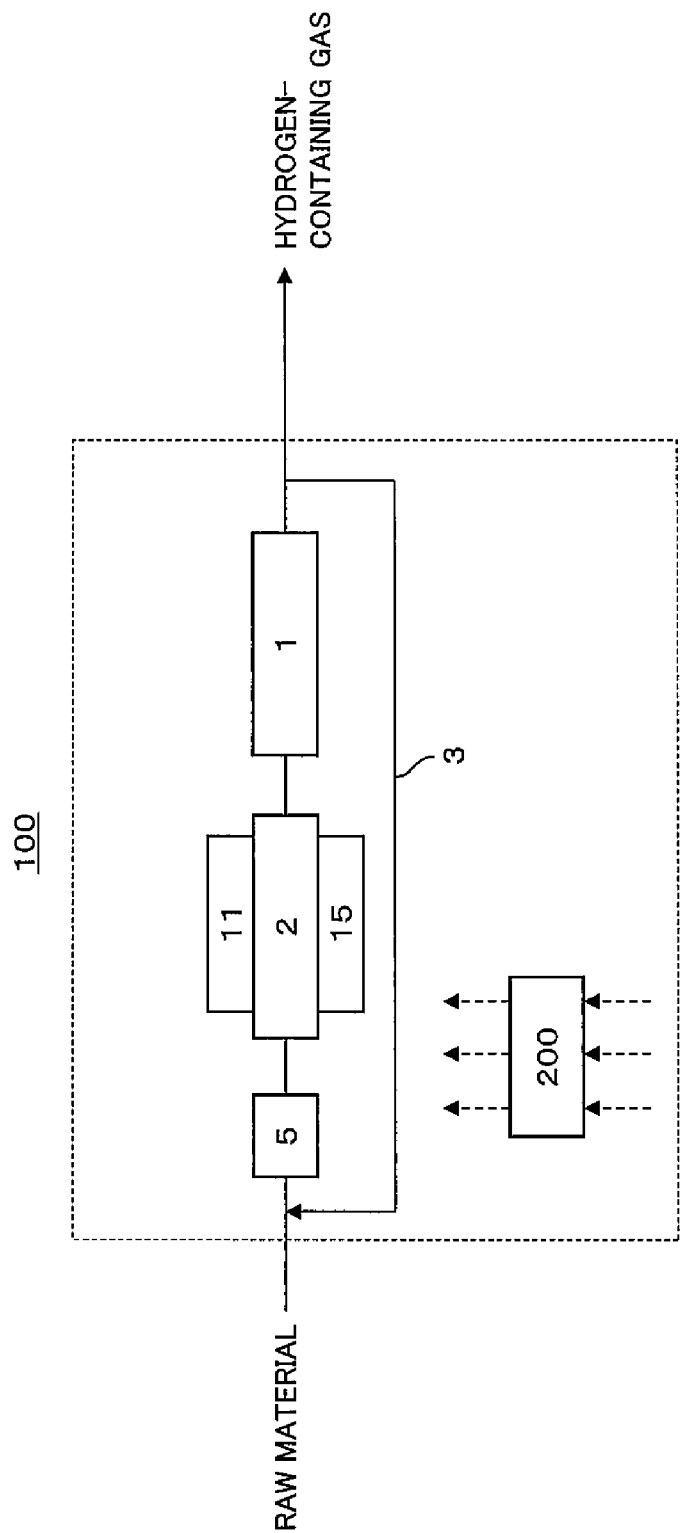
FIG. 8 is a block diagram showing one example of a hydrogen generator according to Embodiment 2.

FIG. 8 is a block diagram showing one example of the hydrogen generator according to Embodiment 2.

As shown in FIG. 8, the hydrogen generator 100 includes the raw material supply device 5, the hydrogen generation unit 1, the hydrodesulfurizer 2, the recycle gas passage 3, the first detector 11, a cooling device 15, and the controller 200.

The raw material supply device 5, the hydrogen generation unit 1, the hydrodesulfurizer 2, the recycle gas passage 3, the first detector 11, and the controller 200 are the same as those in Example 2 of Embodiment 1. Therefore, the description of these components is omitted.

The cooling device 15 cools down the hydrodesulfurizer 2. Various cooling methods are adoptable by the cooling device 15, including a water-cooling method and an air-cooling method. The cooling device 15 may adopt any cooling method, so long as the hydrodesulfurizer 2 can be cooled down by the method.

[Operation]

Figure 9:
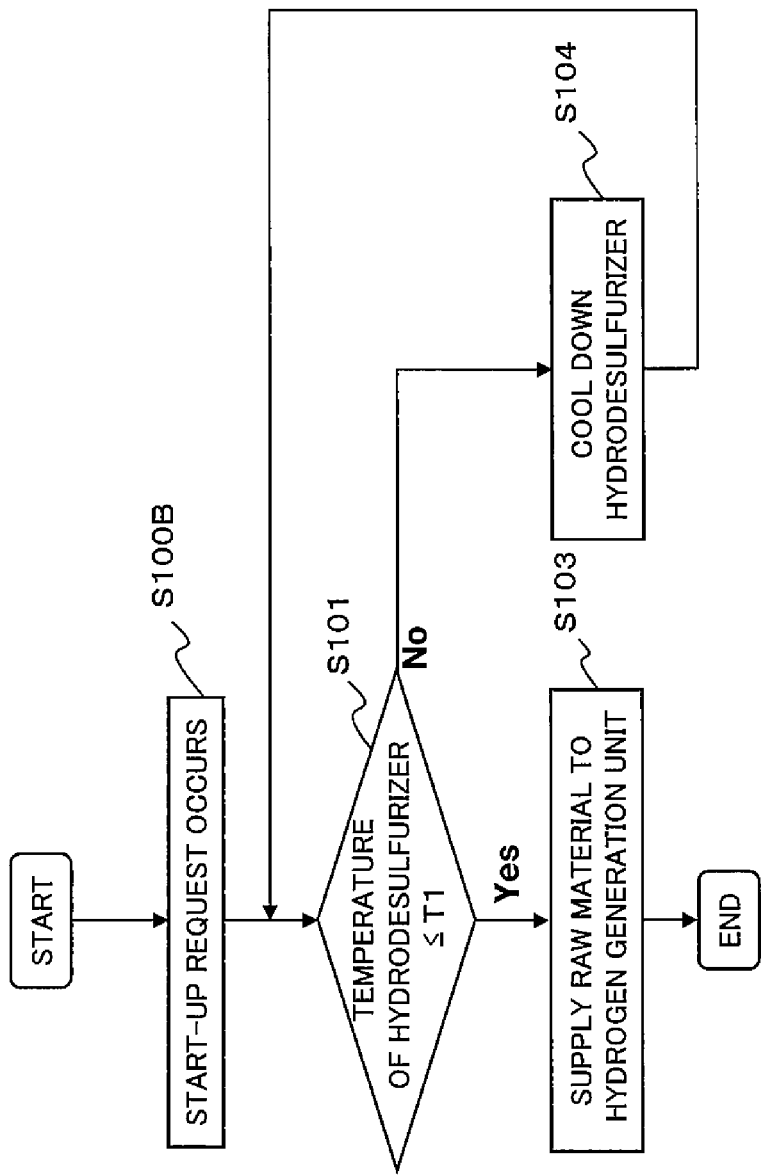
FIG. 9 is a flowchart showing one example of the operation of the hydrogen generator according to Embodiment 2.

FIG. 9 is a flowchart showing one example of the operation of the hydrogen generator according to Embodiment 2.

While the hydrogen generator 100 is in operation, the hydrogen generation unit 1 generates the hydrogen-containing gas by using the raw material, and the hydrodesulfurizer 2 which is heated by heat transferred from the hydrogen generation unit 1 removes sulfur compounds from the raw material.

As shown in FIG. 9, after the hydrogen generator 100 is stopped from operating, if a start-up request occurs (step S100B), then it is determined whether or not the temperature of the hydrogen generation unit 1 is lower than or equal to the predetermined temperature T1 (step S101).

If the temperature of the hydrodesulfurizer 2 is determined to be lower than or equal to T1 in step S101, the same operation as that in step S103 of Example 2 of Embodiment 1 is performed. Therefore, the description of the operation is omitted. It should be noted that the temperature T1 corresponds to such a temperature of the hydrodesulfurizer 2 at which carbon deposition from the raw material is suppressed.

If the temperature of the hydrodesulfurizer 2 is determined to be higher than T1 in step S101, a cooling process of reducing the temperature of the hydrodesulfurizer 2 is performed (step S104). Specifically, for example, the controller 200 causes the cooling device 15 to operate. After step S104, the determination operation in step S101 is performed again.

(Variation 1)

A method of operating a hydrogen generator according to Variation 1 of Embodiment 2 is such that, in the method of operating the hydrogen generator according to Embodiment 2, the cooling process includes a process of supplying combustion air to a combustor which is configured to heat at least part of the hydrogen generation unit.

Accordingly, at operation stop or re-starting of the hydrogen generator, an operation of supplying the raw material to the hydrogen generation unit can be performed more promptly than in a case where the above cooling process is not performed after the generating of the hydrogen-containing gas is stopped.

Except for the above-described features, the method of operating the hydrogen generator according to Variation 1 may be the same as the method of operating the hydrogen generator according to any one of Embodiment 1 and Examples 1 to 3 of Embodiment 1.

[Apparatus Configuration]

Figure 10:
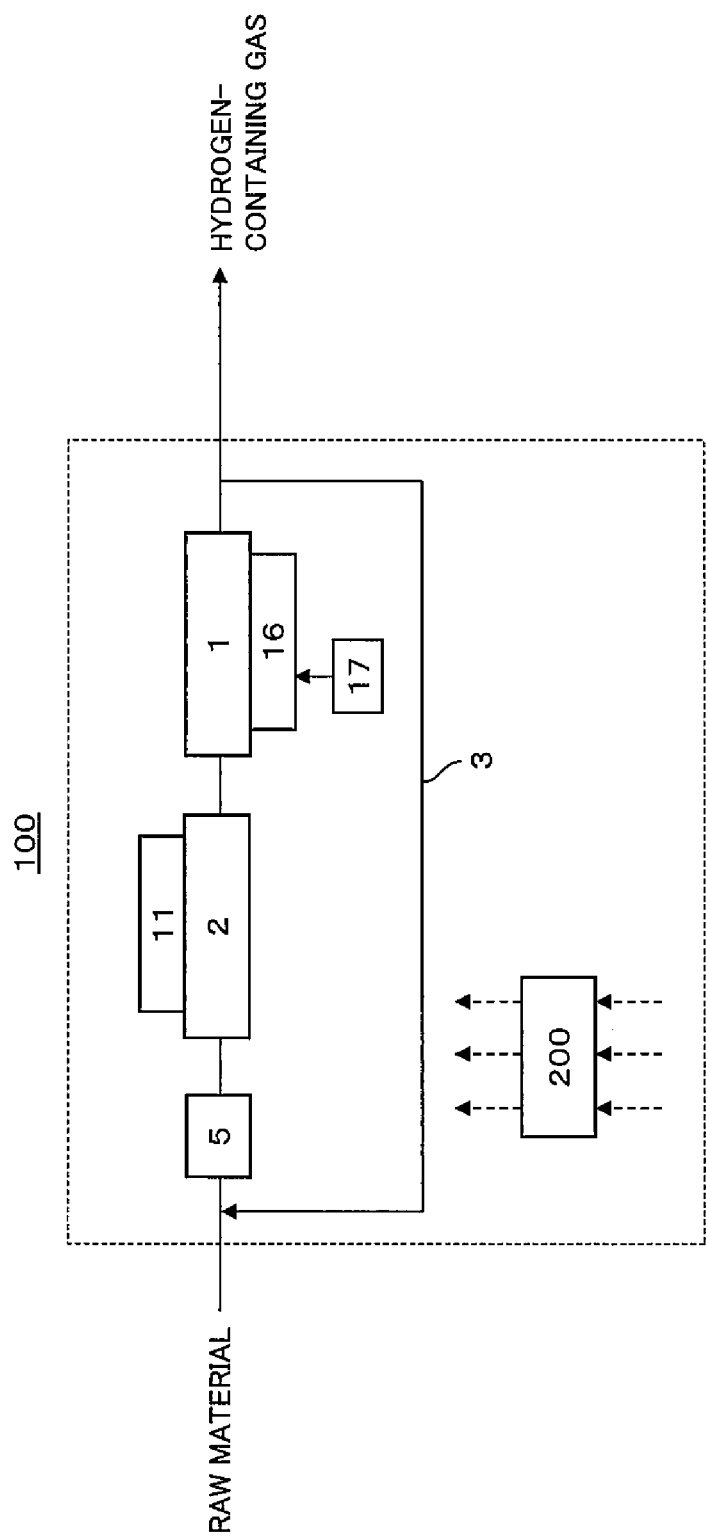
FIG. 10 is a block diagram showing one example of a hydrogen generator according to Variation 1 of Embodiment 2.

FIG. 10 is a block diagram showing one example of the hydrogen generator according to Variation 1 of Embodiment 2.

As shown in FIG. 10, the hydrogen generator 100 includes the raw material supply device 5, the hydrogen generation unit 1, the hydrodesulfurizer 2, the recycle gas passage 3, the first detector 11, a combustor 16, a combustion air supply device 17, and the controller 200.

The raw material supply device 5, the hydrogen generation unit 1, the hydrodesulfurizer 2, the recycle gas passage 3, the first detector 11, and the controller 200 are the same as those in Example 2 of Embodiment 1. Therefore, the description of these components is omitted.

The combustor 16 heats at least part of the hydrogen generation unit 1. A fuel for the combustor 16 may be any fuel. For example, the hydrogen-containing gas discharged from the hydrogen generation unit 1 is used as the fuel for the combustor 16.

The combustion air supply device 17 supplies combustion air to the combustor 16. The combustion air supply device 17 may be configured in any form, so long as the combustion air supply device 17 is configured to supply air to the combustor 16. The combustion air supply device 17 may be a combustion fan, for example.

It should be noted that, in Variation 1, the cooling process of reducing the temperature of the hydrodesulfurizer 2 includes a process of supplying the combustion air to the combustor 16. The combustion air supply device 17 functions as the cooling device 15. Specifically, the hydrogen generation unit 1 is cooled down by exchanging heat with the air from the combustion air supply device 17, and as a result, the hydrodesulfurizer 2 which receives heat transferred from the hydrogen generation unit 1 is cooled down indirectly.

[Operation]

Figure 11:
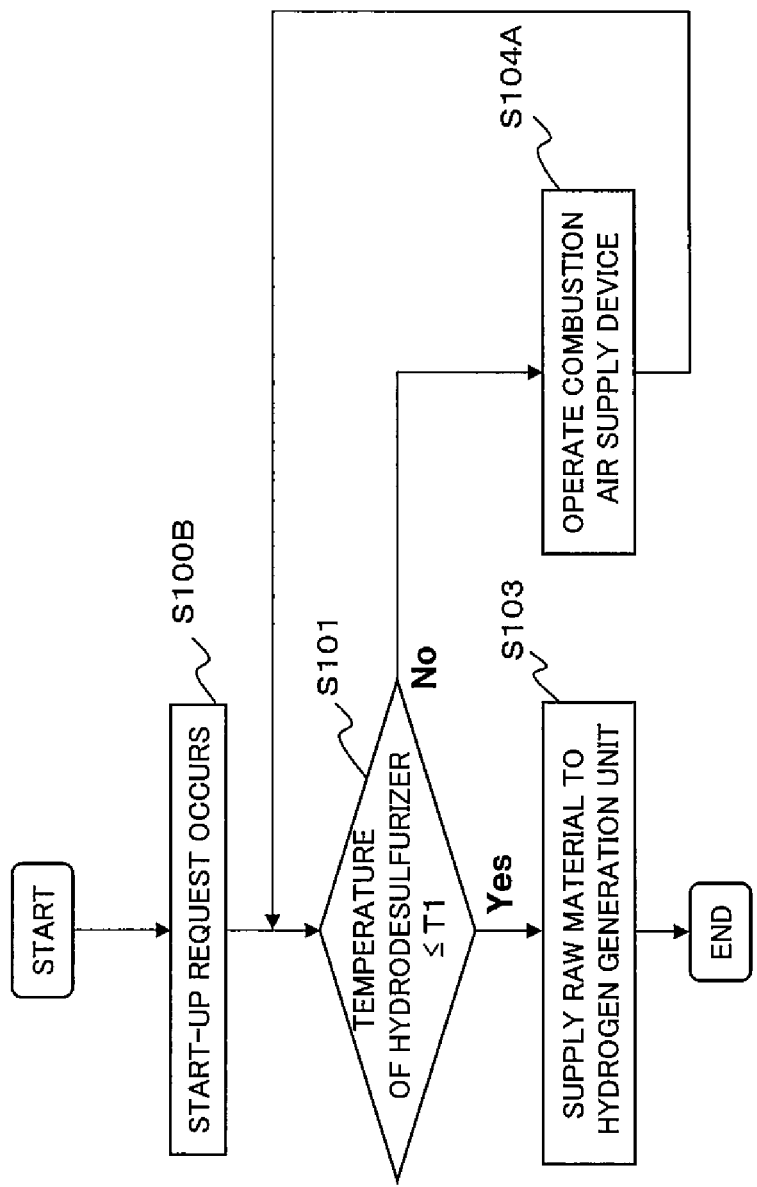
FIG. 11 is a flowchart showing one example of the operation of the hydrogen generator according to Variation 1 of Embodiment 2.

FIG. 11 is a flowchart showing one example of the operation of the hydrogen generator according to Variation 1 of Embodiment 2.

As shown in FIG. 11, after the hydrogen generator 100 is stopped from operating, if a start-up request occurs (step S100B), then it is determined whether or not the temperature of the hydrogen generation unit 1 is lower than or equal to the predetermined temperature T1 (step S101). It should be noted that the temperature T1 corresponds to such a temperature of the hydrodesulfurizer 2 at which carbon deposition from the raw material is suppressed.

If the temperature of the hydrodesulfurizer 2 is determined to be lower than or equal to T1 in step S101, the same operation as that in step S103 of Example 2 of Embodiment 1 is performed. Therefore, the description of the operation is omitted.

If the temperature of the hydrodesulfurizer 2 is determined to be higher than T1 in step S101, the combustion air supply device 17 is caused to operate (step S104A). Specifically, for example, the controller 200 causes the combustion air supply device 17 to operate. After step S104A, the determination operation in step S101 is performed again.

(Variation 2)

First, before specific configurations and operations according to Variation 2 are described, the background that has led to Variation 2 is described.

Table 1 shows one example of results of an experiment of analyzing a state of carbon deposition from city gas 13A onto a commercially available CuZn-based catalyst.

TABLE 1

| Treatment Temperature | Treatment Atmosphere | |
|---|---|---|
| | City Gas 13A Only | City Gas 13A + Hydrogen |
| 200° C. | No carbon deposition | No carbon deposition |
| 300° C. | Carbon deposited (by small amount) | No carbon deposition |
| 400° C. | Carbon deposited (by large amount) | No carbon deposition |
| 500° C. | Carbon deposited (by large amount) | No carbon deposition |

In the example of Table 1, samples of the commercially available CuZn-based catalyst were placed in a fixed bed flow reactor including an electric furnace. Some samples of the CuZn-based catalyst were kept in the reactor for 100 hours in an atmosphere of city gas 13A under respective typical temperatures in a temperature range from 200° C. to 400° C., and the other samples of the CuZn-based catalyst were kept in the reactor for 100 hours in an atmosphere of mixed gas of city gas 13A and hydrogen gas under respective typical temperatures in the temperature range from 200° C. to 400° C. Table 1 indicates a state of carbon deposition on each sample of the CuZn-based catalyst after each sample was kept in the reactor for 100 hours under the respective condition. It should be noted that it is recommended that the CuZn-based catalyst in this example be used within a temperature range from 200° C. to 300° C.

As shown in Table 1, from the samples kept in the atmosphere of only the city gas 13A, carbon deposition on the CuZn-based catalyst was confirmed in a temperature range higher than or equal to 300° C. which is the upper limit temperature value of the recommended use temperature range. On the other hand, from the samples kept in the atmosphere of the mixed gas of city gas 13A and hydrogen gas, carbon deposition on the CuZn-based catalyst was barely confirmed even at temperatures higher than the upper limit temperature value of the recommended use temperature range.

That is, after the hydrogen-containing gas generating operation by the hydrogen generation unit 1 is stopped, even when the temperature of the hydrodesulfurizer 2 temporarily increases to reach such a temperature at which carbon deposition from the raw material occurs, it is considered that carbon deposition from the raw material onto the hydrodesulfurization catalyst is suppressed if the raw material supplied to the hydrodesulfurizer 2 contains the hydrogen-containing gas.

In view of the above, a method of operating a hydrogen generator according to Variation 2 of Embodiment 2 is such that, in the method of operating the hydrogen generator according to Embodiment 2, the cooling process includes a process of causing a gas in the hydrogen generation unit to circulate through a recycle gas passage, through which the hydrogen-containing gas that is to be used for hydrodesulfurization flows, while stopping the supplying of the raw material to the hydrogen generation unit.

Accordingly, the hydrodesulfurizer 2 is cooled down by exchanging heat with the gas in the hydrogen generation unit 1, the gas circulating through the recycle gas passage 3. Therefore, at operation stop or re-starting of the hydrogen generator 100, an operation of supplying the raw material to the hydrogen generation unit can be performed more promptly than in a case where the above cooling process is not performed after the generating of the hydrogen-containing gas is stopped.

Except for the above-described features, the method of operating the hydrogen generator according to Variation 2 may be the same as the method of operating the hydrogen generator according to any one of Embodiment 1 and Examples 1 to 3 of Embodiment 1.

[Apparatus Configuration]

As with the apparatus configuration according to Example 2 of Embodiment 1 shown in FIG. 5, the hydrogen generator 100 includes the raw material supply device 5, the hydrogen generation unit 1, the hydrodesulfurizer 2, the recycle gas passage 3, the first detector 11, and the controller 200. Since the apparatus configuration according to Variation 2 is the same as the apparatus configuration according to Example 2 of Embodiment 1, the description of the apparatus configuration according to Variation 2 is omitted.

[Operation]

Figure 12:
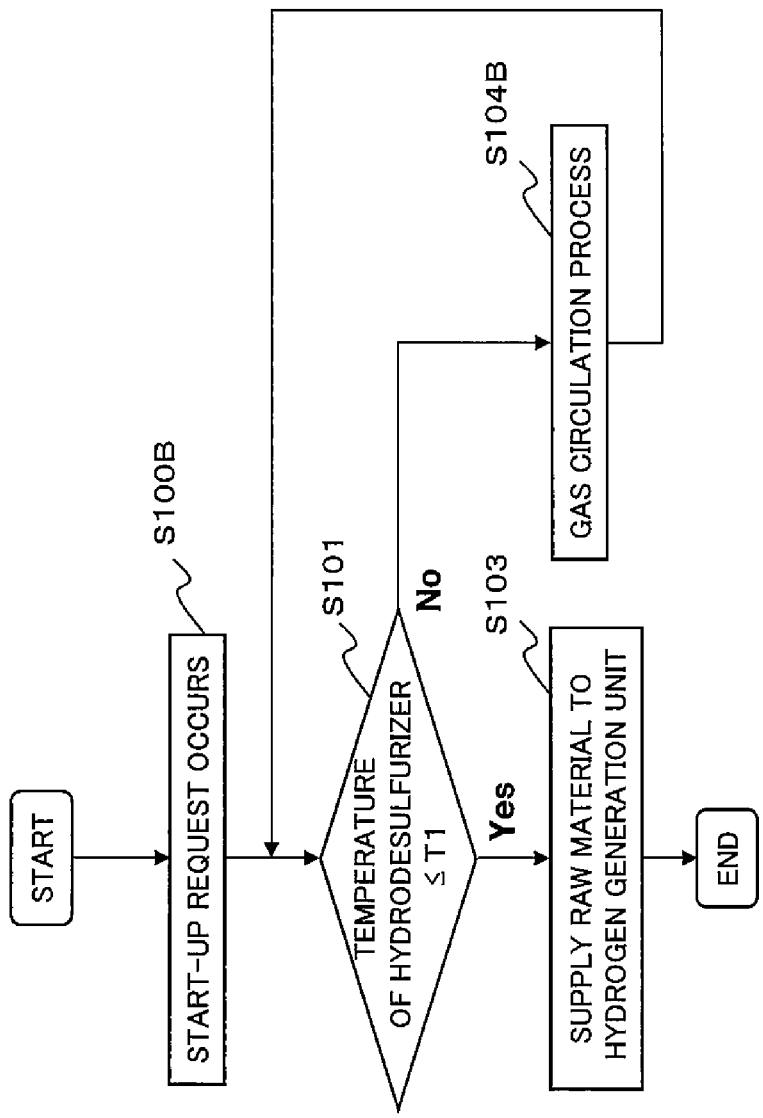
FIG. 12 is a flowchart showing one example of the operation of a hydrogen generator according to Variation 2 of Embodiment 2.

FIG. 12 is a flowchart showing one example of the operation of the hydrogen generator according to Variation 2 of Embodiment 2.

While the hydrogen generator 100 is in operation, the hydrogen generation unit 1 generates the hydrogen-containing gas by using the raw material, and the hydrodesulfurizer 2 which is heated by heat transferred from the hydrogen generation unit 1 removes sulfur compounds from the raw material.

As shown in FIG. 12, at re-starting of the hydrogen generator 100, if a start-up request occurs (step S100B), then it is determined whether or not the temperature of the hydrogen generation unit 1 is lower than or equal to the predetermined temperature T1 (step S101). It should be noted that the temperature T1 corresponds to such a temperature of the hydrodesulfurizer 2 at which carbon deposition from the raw material is suppressed.

If the temperature of the hydrodesulfurizer 2 is determined to be lower than or equal to T1 in step S101, the same operation as that in step S103 of Example 2 of Embodiment 1 is performed. Therefore, the description of the operation is omitted.

If the temperature of the hydrodesulfurizer 2 is determined to be higher than T1 in step S101, a process of causing the gas in the hydrogen generation unit 1 to circulate through the recycle gas passage 3 is performed (step S104B).

Specifically, for example, an on-off valve (not shown) on a raw material passage that is upstream from the raw material supply device 5 and upstream from a connection point where the raw material passage connects to the recycle gas passage 3, and an on-off valve (not shown) on a gas passage that is downstream from the hydrogen generation unit 1 and downstream from a connection point where the gas passage connects to the recycle gas passage 3, are closed, and the raw material supply device 5 is operated. It should be noted that the above specific operation is merely a non-limiting example. Any operation may be performed, so long as the operation makes it possible to perform the process of causing the gas in the hydrogen generation unit 1 to circulate through the recycle gas passage 3.

Thereafter, the determination operation in step S101 is performed again. As a result, the gas in the hydrogen generation unit 1 is caused to circulate through the recycle gas passage 3, through which the hydrogen-containing gas that is to be used for hydrodesulfurization flows. Consequently, the hydrodesulfurizer 2 is cooled down by exchanging heat with the circulating gas.

(Embodiment 3)

A method of operating a hydrogen generator according to Embodiment 3 is such that, in the method of operating the hydrogen generator according to any one of Embodiment 1, Examples 1 to 3 of Embodiment 1, Embodiment 2, and Variations 1 and 2 of Embodiment 2, the step (c) is performed as a special operation mode when the temperature of the hydrodesulfurizer is such a temperature at which carbon deposition from the raw material is not suppressed.

Accordingly, after the generating of the hydrogen-containing gas by the hydrogen generation unit is stopped, performing an operation of supplying the raw material to the hydrogen generation unit can be prioritized as necessary.

Each time the special operation mode is performed, carbon deposition from the raw material onto the hydrodesulfurization catalyst progresses. Therefore, a limit may be set to the number of times to perform the special operation mode. A specific number of times to perform the special operation mode can be obtained from an experiment using the hydrogen generator. As one example, a simulated test was conducted with a fixed bed flow reactor using a commercially available CuZn catalyst. Through the test, it was confirmed that, under the condition that the temperature of the hydrodesulfurization catalyst was a temperature causing carbon deposition from the raw material (e.g., 350° C.), the special operation mode was performable approximately 100 times. It should be noted that these temperature and number of times are merely non-limiting examples. The upper limit value of the number of times to perform the special operation mode is set to a desirable value in accordance with, for example, the temperature of the hydrodesulfurizer when the special operation mode is performed and the configuration of the hydrodesulfurizer.

Except for the above-described features, the method of operating the hydrogen generator according to Embodiment 3 may be the same as the method of operating the hydrogen generator according to any one of Embodiment 1, Examples 1 to 3 of Embodiment 1, Embodiment 2, and Variations 1 and 2 of Embodiment 2.

[Apparatus Configuration]

As with the apparatus configuration according to Example 2 of Embodiment 1 shown in FIG. 5, the hydrogen generator 100 includes the raw material supply device 5, the hydrogen generation unit 1, the hydrodesulfurizer 2, the recycle gas passage 3, the first detector 11, and the controller 200. Since the apparatus configuration according to Embodiment 3 is the same as the apparatus configuration according to Example 2 of Embodiment 1, the description of the apparatus configuration according to Embodiment 3 is omitted.

[Operation]

Figure 13:
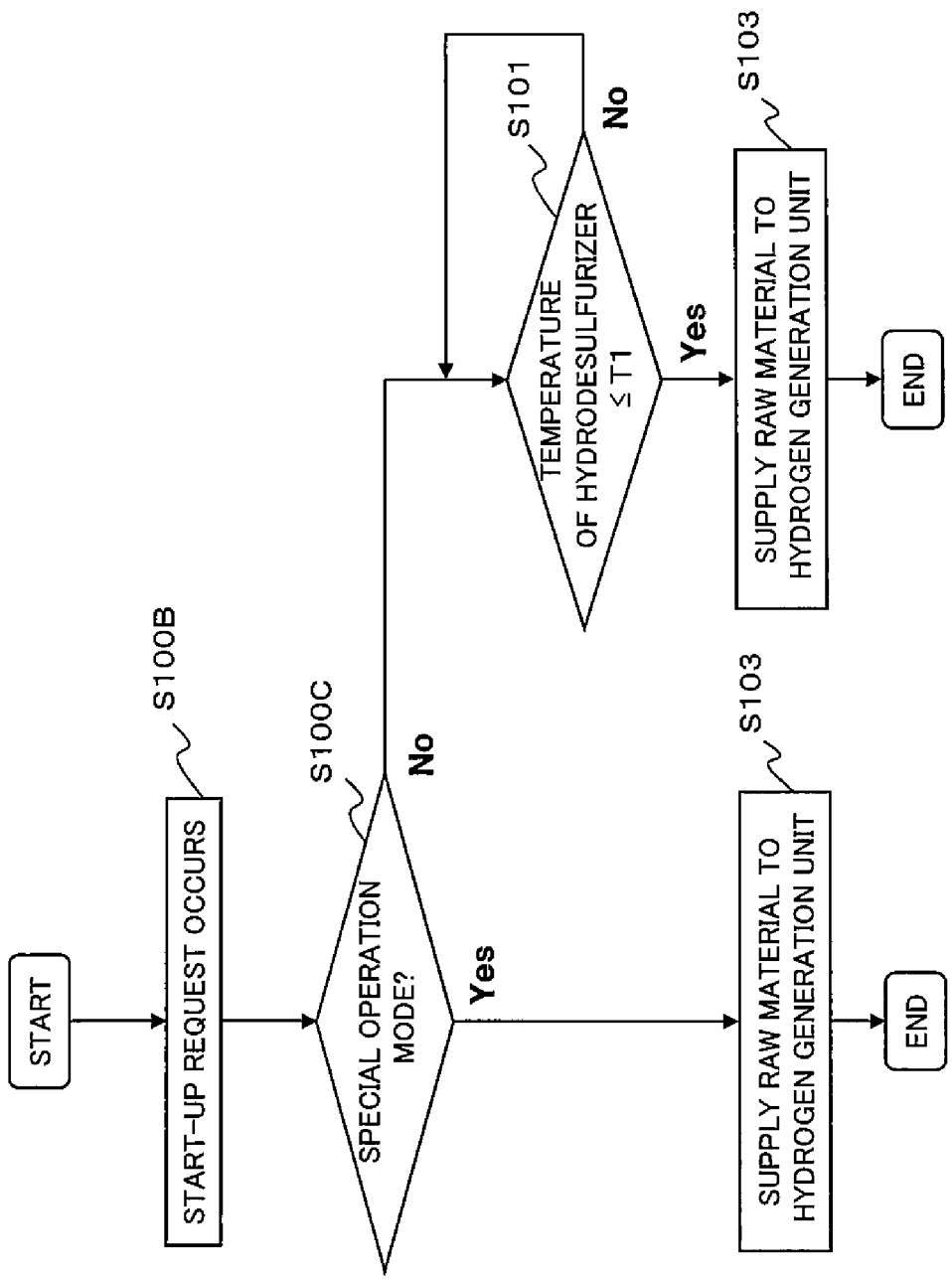
FIG. 13 is a flowchart showing one example of the operation of a hydrogen generator according to Embodiment 3.

FIG. 13 is a flowchart showing one example of the operation of the hydrogen generator according to Embodiment 3.

As shown in FIG. 13, after the hydrogen generator 100 is stopped from operating, if a start-up request occurs (step S100B), then it is determined whether to perform the special operation mode (step S100C).

If it is determined in step S100C to perform the special operation mode, then performing an operation of supplying the raw material to the hydrogen generation unit 1 is prioritized regardless of the temperature of the hydrodesulfurizer 2 (step S103). That is, the raw material is supplied to the hydrogen generation unit 1 even if the temperature of the hydrodesulfurizer 2 is such a temperature at which carbon deposition from the raw material is not suppressed. Specifically, in this step, the controller 200 causes the raw material supply device 5 to operate.

If it is determined in step S100C not to perform the special operation mode, then the same operations as those in step S101 and step S103 of Example 2 of Embodiment 1 are performed. Therefore, the description of these operations is omitted.

(Embodiment 4)

A method of operating a fuel cell system according to Embodiment 4 includes: a step (a) of generating a hydrogen-containing gas by a hydrogen generation unit by using a raw material; a step (b) of removing a sulfur compound from the raw material by a hydrodesulfurizer which is heated by heat transferred from the hydrogen generation unit; a step (c) of performing an operation of supplying the raw material to the hydrogen generation unit after stopping the generating of the hydrogen-containing gas by the hydrogen generation unit; and a step (d) of generating electric power by a fuel cell by using the hydrogen-containing gas. The step (c) is not performed unless, at least, a temperature of the hydrodesulfurizer is such a temperature at which carbon deposition from the raw material is suppressed.

Accordingly, carbon deposition from the raw material onto a hydrodesulfurization catalyst in the hydrodesulfurizer can be suppressed compared to the conventional art.

[Apparatus Configuration]

Figure 14:
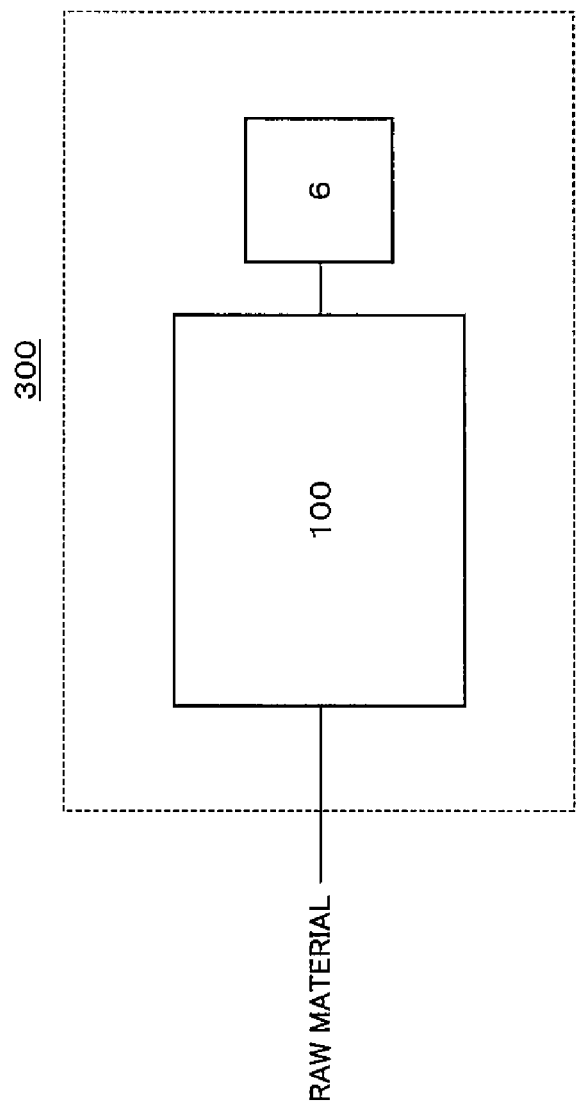
FIG. 14 is a block diagram showing one example of a fuel cell system according to Embodiment 4.

FIG. 14 is a block diagram showing one example of the fuel cell system according to Embodiment 4.

As shown in FIG. 14, a fuel cell system 300 according to Embodiment 4 includes the hydrogen generator 100 and a fuel cell 6.

In this example, the hydrogen generator 100 is the hydrogen generator 100 according to Embodiment 1 or Example 2 of Embodiment 1. However, as an alternative, the hydrogen generator 100 may be the one according to any one of Examples 1 and 3 of Embodiment 1, Embodiment 2, Variations 1 and 2 of Embodiment 2, and Embodiment 3.

The fuel cell 6 generates electric power by using the hydrogen-containing gas generated by the hydrogen generation unit 1. The fuel cell 6 may be any type of fuel cell. Examples of the fuel cell 6 include a polymer electrolyte fuel cell, a solid oxide fuel cell, and a phosphoric-acid fuel cell.

[Operation]

Figure 15:
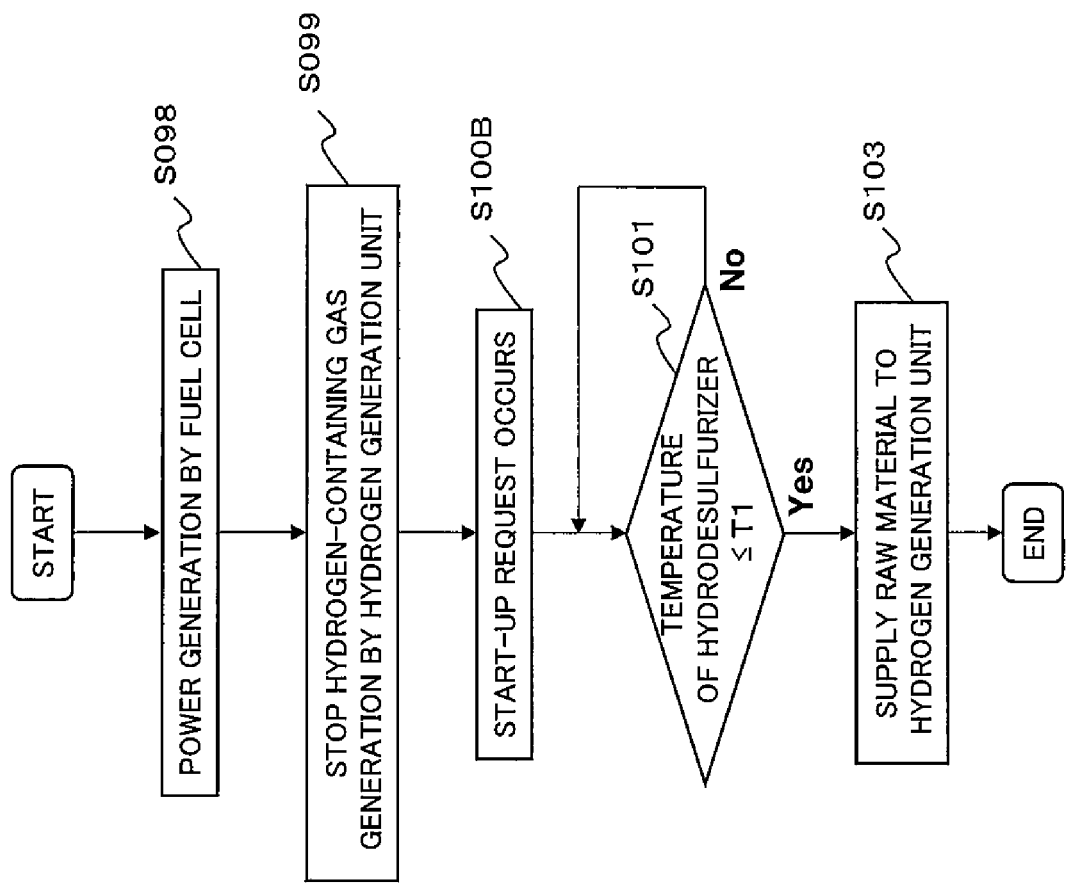
FIG. 15 is a flowchart showing one example of the operation of the fuel cell system according to Embodiment 4.

FIG. 15 is a flowchart showing one example of the operation of the fuel cell system according to Embodiment 4.

While the hydrogen generator 100 is in operation, the hydrogen generation unit 1 generates the hydrogen-containing gas by using the raw material, and the hydrodesulfurizer 2 which is heated by heat transferred from the hydrogen generation unit 1 removes sulfur compounds from the raw material.

As shown in FIG. 15, the fuel cell 6 generates electric power by using the hydrogen-containing gas generated by the hydrogen generation unit 1 (step S098).

In step S099, the generation of the hydrogen-containing gas by the hydrogen generation unit 1 is stopped.

Thereafter, at re-starting of the hydrogen generator 100, a start-up request occurs (step S100B), and the same operations as those in step S101 and step S103 of Example 2 of Embodiment 1 are performed. Therefore, the description of these operations is omitted.

(Variation 1)

A method of operating a fuel cell system according to Variation 1 of Embodiment 4 is such that, in the method of operating the fuel cell system according to Embodiment 4, the operation of supplying the raw material to the hydrogen generation unit includes an operation of supplying the raw material to the hydrogen generation unit at re-starting, and the method further includes: a step (e) of prohibiting the re-starting for a first period when a power generation operation time is relatively long; and a step (f) of prohibiting the re-starting for a second period when the power generation operation time is relatively short. The second period is set based on a period required for the temperature of the hydrodesulfurizer to become such a temperature at which carbon deposition from the raw material does not occur.

Accordingly, the operation of supplying the raw material to the hydrogen generation unit at re-starting is suitably performed in consideration of the following cases: a case where the power generation operation time of the fuel cell system is relatively long; and a case where the power generation operation time of the fuel cell system is relatively short.

Except for the above-described features, the method of operating the hydrogen generator according to Variation 1 may be the same as the method of operating the fuel cell system according to Embodiment 4.

[Apparatus Configuration]

As with the apparatus configuration according to Embodiment 4 shown in FIG. 14, the fuel cell system 300 includes the hydrogen generator 100 and the fuel cell 6. Since the apparatus configuration according to Variation 1 is the same as the apparatus configuration according to Embodiment 4, the description of the apparatus configuration according to Variation 1 is omitted.

[Operation]

Figure 16:
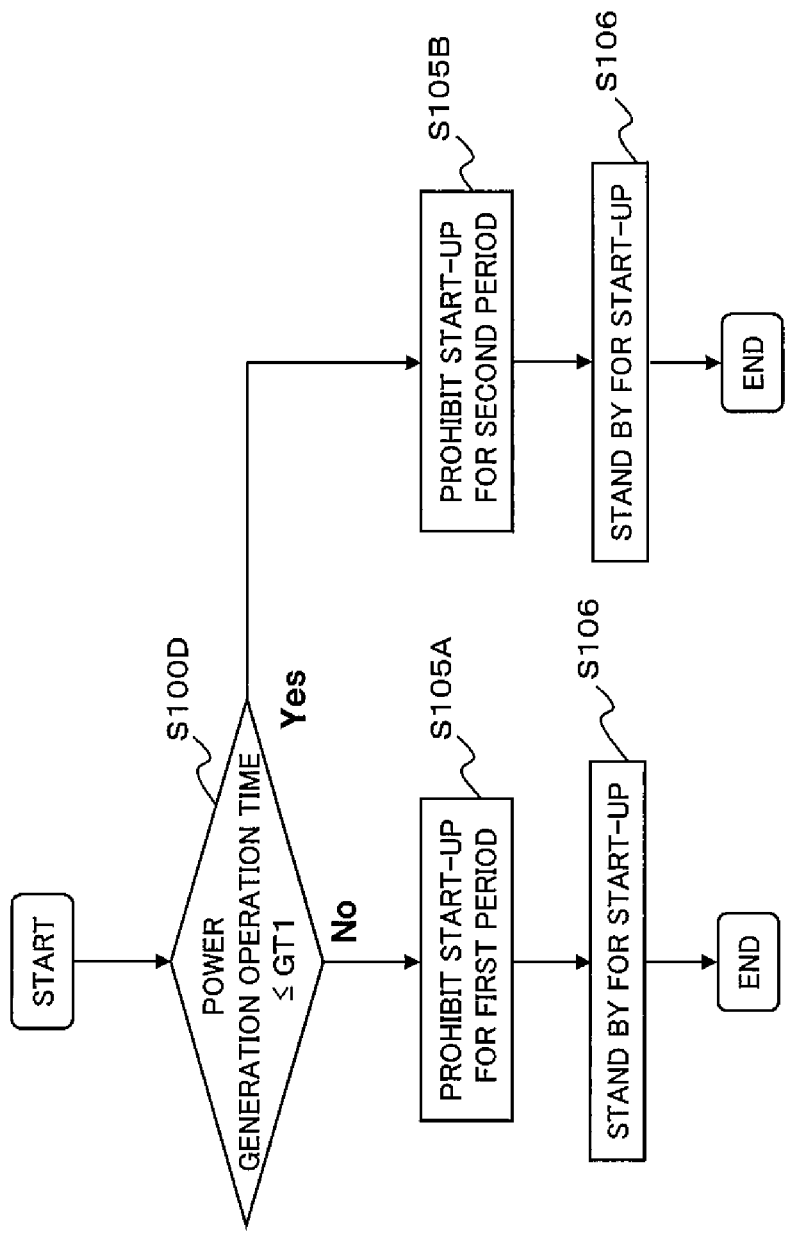
FIG. 16 is a flowchart showing one example of the operation of a fuel cell system according to Variation 1 of Embodiment 4.

FIG. 16 is a flowchart showing one example of the operation of the fuel cell system according to Variation 1 of Embodiment 4.

The fuel cell system 300 according to Variation 1 is configured to determine, when the power generation operation is stopped, whether the power generation operation time of the fuel cell system 300 has been relatively long or relatively short. Specifically, it is determined whether or not the power generation operation time of the power generation system 300 has been shorter than or equal to a predetermined time GT1 (step S100D). The predetermined time GT1 is, for example, such a power generation operation time as to serve as a reference for determining whether or not a stop period (e.g., 5 hours) for recovering the fuel cell system 300 is necessary after the power generation operation is stopped.

If the power generation operation time of the fuel cell system 300 is determined to have been longer than the predetermined time GT1 in step S100D, then re-starting is prohibited for a first period (step S105A). Thereafter, the prohibition of the re-starting of the fuel cell system 300 is lifted, and the fuel cell system 300 enters a start-up standby state where the fuel cell system 300 stands by for re-starting (step S106). That is, step S105A and step S106 collectively form a step of prohibiting re-starting for the first period.

As described above, when the power generation operation by the fuel cell system 300 is stopped, if the power generation operation time of the fuel cell system 300 has been longer than the predetermined time GT1, then the controller 200 controls the operation of the fuel cell system 300 to prohibit re-starting for the first period.

The first period is a stop period necessary for recovering the fuel cell system 300. For example, the first period is set to 5 hours.

If the power generation operation time of the fuel cell system 300 is determined to have been shorter than or equal to the predetermined time GT1 in step S100D, then re-starting is prohibited for a second period (step S105B). Thereafter, the prohibition of the re-starting of the fuel cell system 300 is lifted, and the fuel cell system 300 enters a start-up standby state where the fuel cell system 300 stands by for re-starting (step S106). That is, step S105B and step S106 collectively form a step of prohibiting re-starting for the second period.

In the case where the second period is applied, it is not necessary to take account of the stop period for recovering the fuel cell system 300. Therefore, a period required for the temperature of the hydrodesulfurizer 2 to become such a temperature at which carbon deposition from the raw material does not occur is set as the second period.

As described above, when the power generation operation by the fuel cell system 300 is stopped, if the power generation operation time has been shorter than or equal to the predetermined time GT1, the controller 200 controls the operation of the fuel cell system 300 to prohibit re-starting for the second period.

It should be noted that, in a case where the special operation mode according to Embodiment 3 is used, the second period may be shorter than the period required for the temperature of the hydrodesulfurizer 2 to become such a temperature at which carbon deposition from the raw material does not occur.

INDUSTRIAL APPLICABILITY

According to one aspect of the present invention, carbon deposition from the raw material onto the hydrodesulfurization catalyst in the hydrodesulfurizer is suppressed compared to the conventional art. Therefore, the present invention is useful as a method of operating a hydrogen generator and a method of operating a fuel cell system.

REFERENCE SIGNS LIST 1 hydrogen generation unit
2 hydrodesulfurizer
3 recycle gas passage
5 raw material supply device
6 fuel cell
11 first detector
13 second detector
14 on-off valve
15 cooling device
16 combustor
17 combustion air supply device
100 hydrogen generator
200 controller
300 fuel cell system

The invention claimed is:

1. A method of operating a hydrogen generator, comprising:
   removing a sulfur compound from a raw material by a hydrodesulfurizer which is heated by heat transferred from a hydrogen generation unit;
   generating a hydrogen-containing gas by the hydrogen generation unit by using the raw material including at least hydrogen and carbon;
   stopping the generating of the hydrogen-containing gas by stopping supplying the raw material to the hydrogen generation unit;
   detecting a temperature of the hydrodesulfurizer with a first detector; and thereafter,
   enabling an operation of re-supplying the raw material to the hydrogen generation unit via the hydrodesulfurizer if the temperature of the hydrodesulfurizer detected by the first detector is equal to or less than a first predetermined temperature, the first predetermined temperature corresponding to such a temperature of the hydrodesulfurizer at which carbon deposition from the raw material onto a hydrodesulfurization catalyst is suppressed.

2. The method of operating a hydrogen generator according to claim 1, further comprising detecting a temperature of the hydrogen generation unit with a second detector,
   wherein the operation of re-supplying includes supplying the raw material to the hydrogen generation unit via the hydrodesulfurizer in order to compensate for an internal pressure drop or gas contraction, if the temperature of the hydrogen generation unit detected by the second detector is equal to or less than a second predetermined temperature.

3. The method of operating a hydrogen generator according to claim 1, wherein:
   the stopping the generating of the hydrogen-containing gas is performed during a stop operation of the hydrogen generator, and
   the operation of re-supplying is performed during a re-starting operation after the hydrogen generator is stopped.

4. The method of operating a hydrogen generator according to claim 1, further comprising performing a cooling process of reducing the temperature of the hydrodesulfurizer after stopping the generating of the hydrogen-containing gas.

5. The method of operating a hydrogen generator according to claim 4, wherein:
   the hydrogen generator includes a combustor which is configured to heat at least part of the hydrogen generation unit, and
   the cooling process, performed after stopping the generating of the hydrogen-containing gas, includes a process of supplying air to the combustor.

6. The method of operating a hydrogen generator according to claim 4, wherein:
   the hydrogen generator includes a recycle gas passage, by which the hydrogen-containing gas generated by the hydrogen generation unit is supplied to the hydrodesulfurizer, and
   the cooling process includes a process of causing a gas in the hydrogen generation unit to circulate through the recycle gas passage, while stopping the supplying of the raw material to the hydrogen generation unit.

7. The method of operating a hydrogen generator according to claim 1, wherein the operation of re-supplying the raw material to the hydrogen generation unit is refrained from being performed until the temperature of the hydrodesulfurizer detected by the first detector is equal to or less than the predetermined temperature.

8. The method of operating a hydrogen generator according to claim 1, wherein:
   the stopping the generating of the hydrogen-containing gas is performed during a stop operation of the hydrogen generator, and
   a re-starting operation is prohibited until the temperature of the hydrodesulfurizer is equal to or less than the first predetermined temperature.

9. The method of operating a hydrogen generator according to claim 1,
   wherein, in a special operation mode, the operation of re-supplying is performed for a limited number of times when the temperature of the hydrodesulfurizer is a temperature at which carbon deposition from the raw material onto a hydrodesulfurization catalyst in the hydrodesulfurizer is not suppressed.

10. The method of operating a hydrogen generator according to claim 1, wherein:
    the hydrodesulfurization catalyst includes Co and Mo, and the operation of re-supplying is performed only when the temperature of the hydrodesulfurizer is lower than or equal to 400° C.

11. The method of operating a hydrogen generator according to claim 1, wherein:

the hydrodesulfurization catalyst includes Cu and Zn, and the operation of re-supplying is performed only when the temperature of the hydrodesulfurizer is lower than or equal to 300° C.

12. A method of operating a fuel cell system, comprising:

removing a sulfur compound from a raw material by a hydrodesulfurizer which is heated by heat transferred from a hydrogen generation unit;

generating a hydrogen-containing gas by the hydrogen generation unit by using the raw material including at least hydrogen and carbon;

generating electric power by a fuel cell by using the hydrogen-containing gas;

stopping the generating of the hydrogen-containing gas by stopping supplying the raw material to the hydrogen generation unit;

detecting a temperature of the hydrodesulfurizer with a detector; and thereafter, enabling an operation of re-supplying the raw material to the hydrogen generation unit via the hydrodesulfurizer if the temperature of the hydrodesulfurizer detected by the detector is equal to or less than a predetermined temperature, the predetermined temperature corresponding to such a temperature of the hydrodesulfurizer at which carbon deposition from the raw material onto a hydrodesulfurization catalyst is suppressed.

13. The method of operating a fuel cell system according to claim 12, wherein:

the generating the hydrogen-containing gas by the hydrogen generation unit is performed for a power generation operation time period, the operation of re-supplying includes supplying the raw material to the hydrogen generation unit at a re-starting operation after the fuel cell system is stopped, the method further comprises:

prohibiting the re-starting operation for a first period when the power generation operation time period is relatively long; and prohibiting the re-starting operation for a second period when the power generation operation time period is relatively short, the first period is a period for recovering the fuel cell system, and the second period is set based on a period required for the temperature of the hydrodesulfurizer to become such a temperature at which carbon deposition from the raw material does not occur.

* * * * *